United States Patent [19]

Deli

[11] 4,246,689
[45] Jan. 27, 1981

[54] METHOD OF PRESS ASSEMBLY OF TRACK LINKS ON TRACK PINS

[75] Inventor: Jack M. Deli, Wheaton, Ill.

[73] Assignee: International Harvester Company, Chicago, Ill.

[21] Appl. No.: 937,291

[22] Filed: Aug. 28, 1978

Related U.S. Application Data

[62] Division of Ser. No. 737,967, Nov. 2, 1976, Pat. No. 4,112,574.

[51] Int. Cl.³ ............................................. B23P 19/00
[52] U.S. Cl. ...................................... 29/436; 29/148.3; 29/525
[58] Field of Search ................ 29/525, 527.1, 149.5 S, 29/446, 436, 148.3; 305/11; 267/153

[56] References Cited

U.S. PATENT DOCUMENTS

| | | | |
|---|---|---|---|
| 3,336,089 | 8/1967 | Krickler | 305/11 |
| 3,425,754 | 2/1969 | Artman | 305/11 |
| 3,447,837 | 6/1969 | Deli et al. | 305/11 |
| 3,451,727 | 6/1969 | Deli et al. | 305/11 |
| 3,480,338 | 11/1969 | Durham et al. | 305/11 |
| 3,511,492 | 5/1970 | Galbato | 267/153 X |
| 3,781,066 | 12/1973 | Deli et al. | 29/148.3 X |
| 4,126,359 | 11/1978 | Holze | 305/11 |

Primary Examiner—Charlie T. Moon
Attorney, Agent, or Firm—John W. Gaines; Ronald C. Kamp; F. David AuBuchon

[57] ABSTRACT

For inclusion as spacer between the confronting faces of first and second axially spaced apart members mounted for limited angulation about a common axis, the first member having a seal recess formed in one face, the second member having an end face opposite the seal recess, the improvement of: a laminated torsielastic thrust bushing consolidated in the recess as a one-piece part therein, with its nonmetallic laminae so uniformly thin that the part in the axial direction is a substantially incompressible composite piece.

7 Claims, 7 Drawing Figures

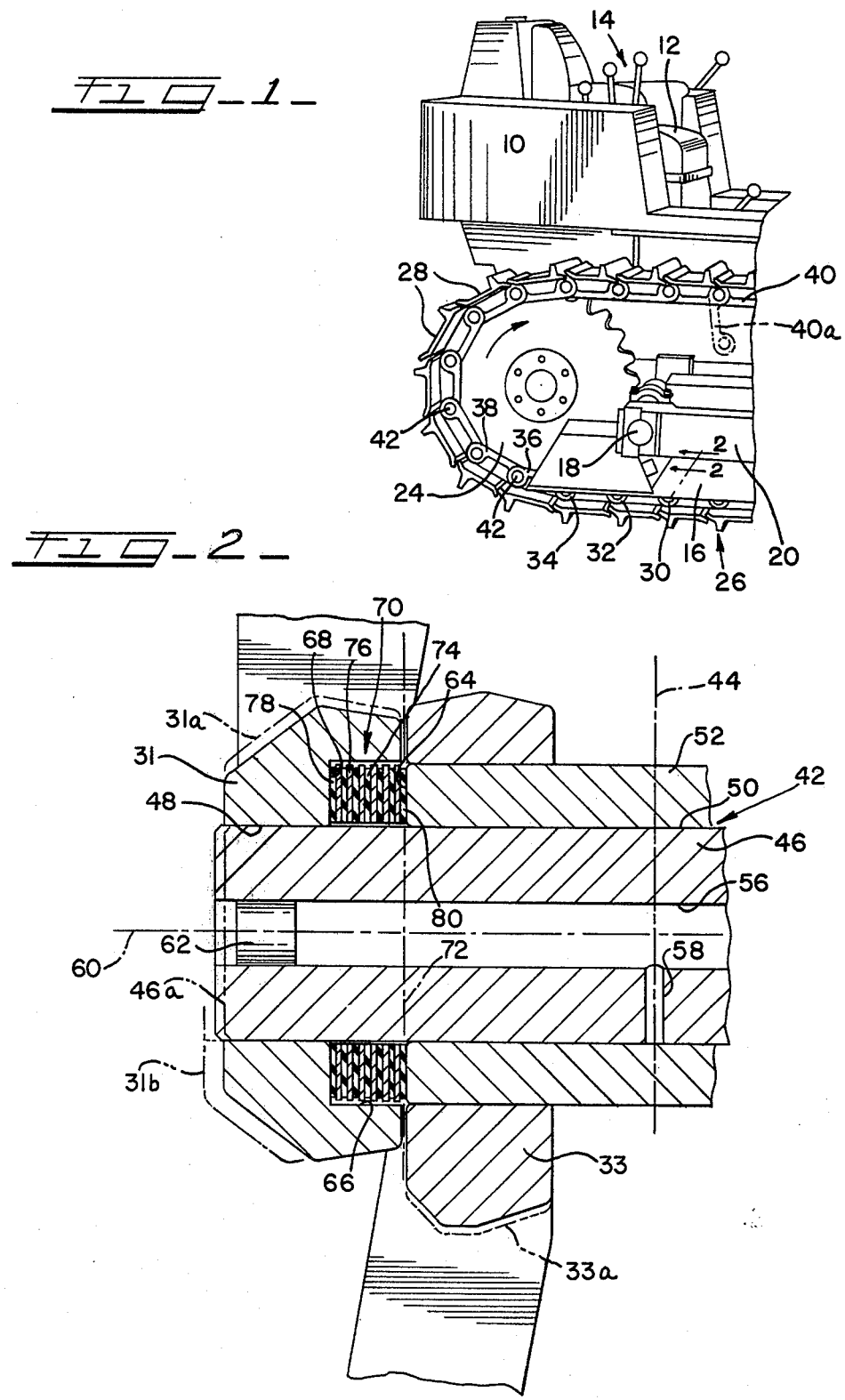

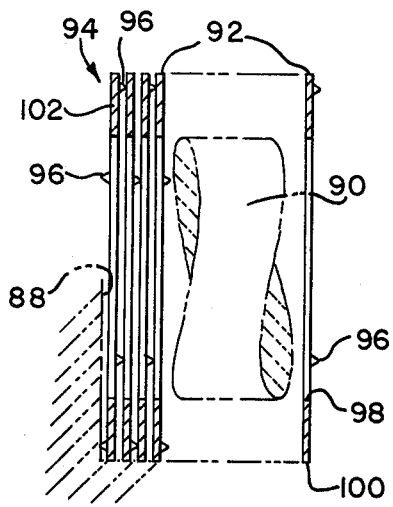
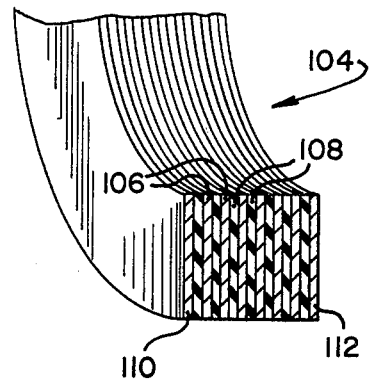
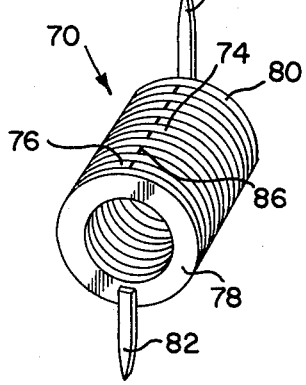
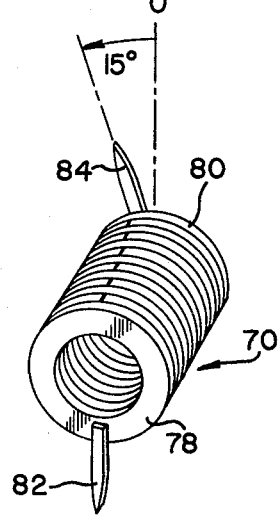
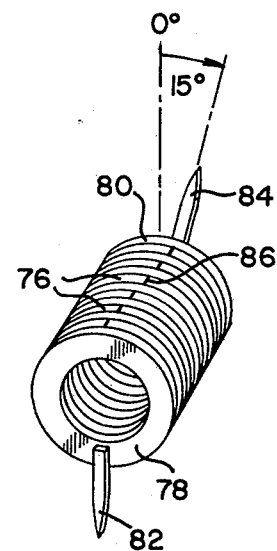

METHOD OF PRESS ASSEMBLY OF TRACK LINKS ON TRACK PINS

The present application is a division of Deli application Ser. No. 737,967 filed on or about Nov. 2, 1976, now U.S. Pat. No. 4,112,574, issued Sept. 12, 1978.

This invention relates to small-angle-oscillatable joints protectable by elastic means against entry of dirt into and escape of lubricant from the bearing zones, and particularly to internally lubricated track chain joints and a laminated torsielastic thrust bushing interposed therein to protect the pivoting and thrust zones in same. The bushing is preferably laminated into a one-piece part, with its non-metallic laminae so uniformly thin that the part in the axial direction is a substantially incompressible composite piece.

In their more common applications, face seals, thrust bearings, spacers, and thrust rings must accommodate continuous revolving and so the general design has the purpose to let them revolve. When constricted in their function to oscillate through a small angle however, they continue to retain a sliding, rubbing, rolling, or slipping characteristic according to their generalized design, often leading to the lubrication film resisting an even distribution throughout 360° or, on occasion, squeezing thin and sometimes rupturing locally or escaping under load. The motion, slight though it is, will then unwantedly bring into contact a metal-to-metal interface at points, resulting in infiltration, galling, scoring, leakage, fretting, or abrasion depending upon the application, and will inevitably account for wear in service.

A flexible device such as an elastic bushing could be viewed as a specialized substitute perhaps, except the ends of the bushing would tend to do rubbing much after the fashion of spacers and thrust rings, or after the fashion of the interfaces in a face seal. If on the other hand the bushing is fixed at the ends, to function after the manner of an elastic hose coupling section, for example, the end locking means would undesirably prevent relative movement at any time; so the anchor points for the locking means would ultimately require being broken loose or somehow permanently disengaged, thus permanently incapacitating the latter when changing the end adjustment of the coupling.

Background patents include but are not limited to U.S. Pat. Nos. 851,049, 1,203,327 1,664,296 1,815,344 1,925,967 2,055,471 2,493,414 2,763,032 2,900,182 2,995,907 3,228,673 3,330,519 3,336,089 3,341,259 3,357,758 3,389,921 3,377,110 3,425,754 3,447,837 3,526,441 3,574,419 3,690,369 3,679,197 3,730,509 3,781,066 3,948,574 4,076,333 4,112,574, 4,126,259, and French Pat. No. 1,429,228/1965.

My invention provides a torsielastic bushing with thrust capacity sufficient to allow opposite ends of the bushing to be abuttingly clamped slip-free relative to opposing, clamping, friction faces, so that small angle oscillations are accommodated solely by torsional wind-up in the bushing. In other words, rubbing is obviated because all torsional working strain takes place in unlubricated shear layers in the bushing, which bushing therefore presents an impervious integrity closing off all paths between and including the friction faces. Freedom from rubbing means there is no sliding face in the seal to get scored and leak. Because the coefficient of friction involved is of course limited to a finite value, the static frictional resistance will give way to limited slippage of adjustment accommodative to a large angle of movement which is encountered whenever the regular working strain is exceeded, usually singularly so.

Objectives of the invention include a bushing-in-joint installation providing enforced traction of the ends of the bushing for leak-free, slip-free, small angle oscillations from an at-rest position, yet accommodative to large angle adjustment so as to initially reach the at-rest position; providing substantial thrust capacity without requiring lubrication to do so; and being a composite piece unitarily bonded together to provide impervious integrity to the bushing from one leak-free end abutment to and including the other.

The foregoing infiltration of contaminant, galling, leakage of lubricant from the joint, fretting, abrasion, and wear will be substantially eliminated or materially reduced with practice of my invention, as will now be explained in detail.

Features, objects, and advantages will either be specifically pointed out or become apparent when, for a better understanding of my invention, reference is made to the following description taken in conjunction with the accompanying drawings which show a preferred embodiment thereof and in which:

FIG. 1 is a perspective elevational view, taken at the right side, of the rear portion of a crawler dozer embodying the present invention;

FIG. 2 is a sectional view of a track chain joint, taken at the FIG. 1 section line 2—2 through the track pin, and typical of the bushed joints of the crawler dozer track;

FIGS. 3, 4, and 5 are isometric views of an elastomeric bushing according to the invention viewed in various operating positions and forming an essential part of each track chain joint;

FIG. 6 is a longitudinal sectional view of parts of the bushing as assembled in a molding die prior to elastomeric molding; and FIG. 7 is an isometrically shown cross sectional view of part of a modified form of the bushing.

More particularly in FIG. 1 of the drawings, the rear end of a crawler dozer 10 is shown having, at the top of the body, a seat assembly 12 and operator's controls 14 by which the vehicle is steered by driving.

At opposite sides, the dozer 10 carries track frames, the near one of which is seen at 16. A trunnion ball 18 on each track frame pivotally supports one of the dozer push arms such as the right push arm 20 illustrated.

Over the track rollers, not shown, track idlers, not shown, and a drive sprocket 24 of each track frame, an endless track assembly is trained such as the right endless assembly 26, illustrated. Grouser plates 28 of the right assembly 26 are individually bolted to paired supporting track links including a pair of outboard 30 and inboard 31 (FIG. 2) links, an adjacent pair of outboard 32 and inboard 33 (FIG. 2) links, the next adjacent pair including the outboard link 34 of that pair, another adjacent pair including an outboard link 36, a next adjacent pair including the outboard link 38 thereof, and so on, including the pair of which the outboard link 40 is the last one shown, having both the solid line position and its counterpart, broken line position 40a. The inboard link of each pair and the outboard link of that pair are articulated to the next preceding link pair by the customary bushing and pin connection 42.

BUSHING AND PIN CONNECTION—FIG. 2

It will be understood with respect to the bisecting mid plane provided for the connection 42 and represented by the track centerline 44, that in such connection the outboard link 32, not shown, and its companion inboard link 33 are symmetrical and form the pair of relative leading links. Similarly, the outboard link 30, not shown, and inboard link 31 are symmetrical at the connection 42 and form thereat the relative pair of trailing links, each pair of such links carrying an individual grouser plate on the far side, not shown. A track pin 46 in the link bore 48 holds the link 31 with an interference fit so as to nonrotatably support the same, whereas the track pin 46 defining a circumferential gap 50 of a few thousandths of an inch with a bushing 52 rotatably supports the bushing 52. The bushing 52 in a bore 54 of the link 33 holds the link with an interference fit and supports it nonrotatably on the bushing 52.

The gap 50 providing working clearance for relative rotation between the bushing 52 and pin 46 of connection 42 is constantly lubricated from an oil reservoir located in a central longitudinal bore 56 in the hollow pin 46, by means of an interconnecting radial passage 58. The passage 58 is in the bisecting mid plane of the connection 42 and extends through the wall of the pin 46 perpendicularly to the central axis 60 of the connection common to the pin, bushing, and links 31 and 33. A reservoir is filled with heavy, extreme pressure lubricating oil introduced through a vacuum process, whereupon the end of the bore 56 is removably stoppered by an appropriate bore plug 62 which can be made of a yieldable, leak free mass appropriately compressed in place.

The same as at the opposite end, not shown, the bushing 52 has a perpendicularly faced off smooth surface forming a bushing driving face 64, and confronts a seal recess formed by a cylindrical counterbore 66 having a base floor defining a perpendicularly disposed smooth bushing driving face 68. Having appropriate working clearances at its inner and outer cylindrical circumferences, a laminated torsielastic one piece bushing 70 fits in and substantially completely fills the link counterbore 66.

DISASSEMBLY—FIG. 2

It will be apparent upon inspection that the bushing and pin connection 42, which is representative of all joints in the track assembly disclosed, allows the chain to be disassembled at any joint in its entire length for spot replacement or other repairs required. Specifically, pressing the pin 46 axially so that, as it moves through the joint, it will pass through transitory positions such as the broken line position 46a, will enable the pin 46 to be completely withdrawn. Thereupon, along the plane 72 between links and along the similar plane between the opposite links, not shown, the pair of leading links 32, not shown, and 33, and the pair of trailing links 30, not shown, and 31 may be readily disconnected from one another with the pin bushing 52 retained by the leading links and with the laminated torsielastic bushing 70 at each side retained by the trailing links in their respective counterbores one of which is shown at 66.

So, presently, there is no master link as such and no requirement for all repairs on the chain, where disassembly is required, to be started by disconnection of the chain assembly at a master joint.

The initial longitudinal separating motion for the outer trailing link 31 and for the oppositely directed or extending, inner leading link 33 will take same through their respective broken line positions shown at 31a and 33a.

By way of description, but not of limitation because necessarily each torsielastic bushing design will depend upon the elastomeric modulus of elasticity, Shore hardness, method of bonding, metal disk material and pretreatment, and other characteristics, the following is an example of numbers and sizes for the bushing and the bushing's component parts, particularly including the intervening elastomer disks 74 and metal disks 76, arranged with the elastomer bonded to each metal side so as to keep all metal separated due to its being unitarily sandwiched between adjacent identical layers of the elastomer:

Bushing inside diameter 2.2 inches (5.6 cm)
Outside diameter 3.25 inches (8.25 cm)
Bushing thickness axially 0.75 inch (1.91 cm)
Pieces metal 12
Pieces elastomer 13
Thickness metal disk 76 0.0312 inch (0.0795 cm)
Thickness elastomer disk 74 0.0312 inch (0.0795 cm).

The sandwiching with elastomer can, among other ways, be accomplished by hot molding, resulting in producing heat fused interfaces which provide the sole means of bonding the alternating laminations together as a unitary, rectangular or square section, toroid or ring structure.

OSCILLATION—FIG. 1

Incorporated in association with the opposite ends of the pair of links which includes the outboard link 36, the four laminated bushings, not shown, are in effect in a position of rest or repose. That is, those two links associated with those particular four bushings are at an angle of about 15° off the straight line of the trailing pair of links relative thereto, namely, that pair including the outboard link 34 which in FIG. 1 is shown forming that immediate part of the track rail parallel with and on the ground. Also, the pair of links associated with those four bushings are at an angle of about 15° to the relatively leading pair of links thereto including the outboard link 38 which can be seen to have rotated into complete engagement with the sprocket 24.

On the other hand, the succession thereahead of leading bushings relative to the four in question will be in effect under a 15° more wound up position than the four bushings in question and the succession of trailing bushings will be in a condition of 15° less wind up. That is to say, in an average track chain in service the bushings will not be required to twist more than about 15° either way from their untwisted position of rest or repose.

In installing the track chain assembly prior to putting it into service, however, the installer finds that the chain comes rolled on itself whereby the links are at a considerable angle to one another as represented by the broken line link position 40a of the outboard link 40 shown in FIG. 1. The practical effect therefore is that the small 15° angular oscillations in service are the regular or normal condition as a rule, whereas the singular condition also has to be accounted for when bushings must accommodate to large angulation without damage or impairment of their characteristics for the later, routine small angle repetitive operations.

TRACTION—FIG. 2

In the bushing's preferred form where the two outermost metal layers are covered with elastomer, the resulting opposite outer layers of the elastomer 78 and 80 perform several advantageous and important functions, quite in contrast to the regular rubbing seal. Drivewise, in terms of their first function, the thrust bushing 70 has a first full face driven side 78 which is engaged in nonrotative frictional driving contact with the counterbore floor 68, and a full face sealing side 80 engaged, not in annular rotative contact with an end face 64 of the bushing member 52 to be sealed, but rather in nonrotative frictional driving contact the same as the first side.

Sealwise, in terms of their second function, the outer layers 78 and 80 of elastomer by virtue of their traction contact therewith, establish an interface providing an uninterrupted pressure ring of torsielastic bushing contact over the full face area, over which the loading is uniformly distributed, thus yieldably and positively sealing the driving faces 68 and 64 clamped thereagainst under axial preload. In other words, dirt is screened out by an uninterrupted, load-bearing flexible wall through which no gap, crack, or opening will form or can be formed.

Finally, flexibilitywise in terms of their third function, the opposite outer layers 78 and 80 of elastomer on the torsielastic bushing 70 function in the regular way of controlled friction traction to resistively rub their way into a new adjusted position to assume their position of repose on singular occasions, accommodative of the excessive angle through which the links may move in going into or out of the track chain, rolled up condition for storage or use.

LAMINATION AND SHAPE FACTOR—FIG. 2

It has been shown that compressive load carrying ability or capacity of a layer of resilient material in a direction perpendicular thereto may be increased many times through the inclusion of spaced parallel laminae of nonextensible material while the yielding capacity in that direction is correspondingly reduced. That is, a given thickness of rubber for instance loses its compressive resilience increasingly with the increased number of layers into which it is divided by parallel laminae of nonextensible material. At the same time its compressive load carrying capacity in that direction increases proportionately. The reason is that bulging is controlled to specific limits under a concept known as shape factor, which is the ratio of loaded area to that free to bulge under loading. When shape factor data are applied to elastomer formulation, lamination thickness, and strata depth, then axial and torsional properties are tailored to predetermined standards of behavior.

Also, however, at the same time, the ability of the resilient material to yield in torsional shear in a direction along the layers is almost completely unaffected by the laminations and is essentially the same whether the rubber is in one layer or a plurality of layers separated by layers of nonextensible material such as metal disks. So, elastomer layers have been given ability to carry relatively large compressive loads generally perpendicular to the layers while simultaneously being relatively soft in torsional shear along the layers so as to readily accommodate relative movement by twisting.

The requirements for the elastomer selected here will be that it be resistant to grease and oil attack, exhibit compressional stiffness, and be torsionally soft up to a point, and selection will be made on basis of the elastomer's Shore hardness, bonding properties, modulus of elasticity, and accommodation as to shape factor, among other characteristics. The significance of the large mass of elastomer present, having the inherent nature of a long fatigue life and a pronounced self damping or hysteresis quality, lies in its exceptional ability to withstand shock and never to need lubrication. Butyl and other synthetic rubbers which do not deteriorate in the presence of oil and grease will be satisfactory materials and, more broadly, silicon and other elastomers will prove satisfactory.

The steel disks mentioned are not the only types to be considered and they may also be of aluminum, stainless steel, iron, and under extreme circumstances titanium and titanium alloys. The disks will not measure up to performance unless they are of nonextensible material, because stretching at the points where they separate the rubber laminae would impair the bushing characteristics designed for.

To a point, the bushing as employed herein performs after the manner of an elastic, hose-like coupling in accommodating to transmission of torsional forces, but does so strictly on basis of a torque-limiting overload coupling which is torque responsive so as to release under overload by slipping. My composite bushing does not come apart in the hand and is not separable into its original discrete components. And while it could, as viewed alone, be somewhat logically guessed to be a torsion spring of sorts, my bushing in the general sense is not relied upon for the biasing function associated with springs; it is not really used to restore some device to a recentered position or to a satisfied unloaded position, or the like.

ASSEMBLY—FIG. 2

Installation of the torsielastic bushings takes place during regular assembly of the track chain joint. First the link members 32, not shown, and 33 are at their inner bore 54 interconnected by pressing the bushing 50 into said bores. Thereupon, the track pin 46 is passed through the bushing 52 and the torsielastic bushings, of which the bushing 70 is illustrated in FIG. 2, are introduced over the opposite ends of the pin 46 to approximate their final position.

Then the links 30, not shown, and 31 of the next following pair have their bores 48 pressed in the assembly press upon the ends of the pin 46 so as to enclose the torsielastic bushings and, in some instances, the pressing continues until the outside mouths or end faces of the counterbores 68 rest upon the confronting end faces of the inner link bores 54 with slight play.

In one preferred form for assembly, however, the axially incompressible torsielastic bushings 70 are accurately sized as to length to cooperate as auxiliary spacers with the track pin bushing element spacer 52 in establishing the degree to which the link 31, for example, is pressed inwardly past its transistory position as shown by the broken lines 31b into the illustrated, finally spaced position completing the joint connection 42. Thus, at the plane 72 between the links a predetermined working gap is established between the working links 31 and 33, for example, inherently with final assembly. The bushings readily withstand several thousands of pounds force commonly used in the assembly press.

The vacuum operation and injection of extreme pressure oil, already described, take place in the joints following assembly of the entire chain, as preferred either before installation upon a crawler or prior to the roll up of the chain assembly for use as original equipment, or use as a replacement or spare part, or simply for storage. In the specialized bearing zones hereof, the wet zone will blanket the pivoting zone whereas, in the dry zone, the torsielastic bushing will be dry in its handling of thrust and will afford a two way barrier to the pivoting zone, against contamination in and leakage out.

TWISTING DUE TO WORKING ANGULATION—FIGS. 3, 4, and 5

In these figures, FIG. 5 illustrates the stressed condition of the torsielastic bushing 70 when the links are extending oppositely, precisely flat, to form a flat track rail at the point indicated by section lines II—II in FIG. 1. For convenience of understanding, reference pointers 82 and 84 are superimposed in these figures on the respective elastomer disks 78 and 80 respectively, and reference indicia 86 are added to the metal disks 76 of the drawings to aid in visualizing the torsielastic strain resulting. FIG. 5 shows a torsional deflection of 15° away from position of rest.

The FIG. 3 showing is in correspondence with the bushing 70 accommodating to the position of link 36 in FIG. 1. No appreciable torsional stress is residual although the substantial compressive stress, axially, stays essentially constant for all of these figures. The reference pointer 84 will be seen to be in the zero deflection position and the reference indicia 86 on the respective metal disks 76 are all axially aligned along the outside of the bushing. Deflection due to the steady axial thrust pressure amounts to a lengthwise compressive strain barely perceptible, if at all.

The deflection illustrated in FIG. 4 is opposite to the deflection of FIG. 5 and the bushing 70 will be seen to have been deflected 15° in the opposite rotational direction corresponding to the position of the bushing, not shown, in the leading end of link 38 which is fully on the sprocket 24 as seen in FIG. 1. The entire twist is taken up internally, all in the shear planes within the elastomer.

Deflection of much above 15° is by intention not provided for, and the coefficient of friction of the drive is made deliberately low enough to ensure that static frictional resistance will give way to limited slippage of adjustment accommodative of link movement in excess of the 15° approximate angular relative movement provided for. Inherently if the total pivoting angle amounts to 30° more or less, the properly designed bushing will slip at its ends until the natural angle of repose thereof will fall about halfway between, i.e., to allow half the deflection (15°) to one side and half (15°) to the other side by way of natural or automatic accommodation obviating slippage in service.

A torsielastic bushing functioning in the foregoing manner so as to be practically axially incompressive, torsionally soft, function as a spacer, act as an effective seal, and be in effect an end thrust bearing, will be appreciated to afford many advantages. The bushing never needs lubrication, it provides uniform load distribution over the end faces, it has zero frictional break away force because there is no sliding or rubbing or rolling friction, the bushing provides vibration and noise control to a degree, it eliminates brinelling, utilizes no grease, dust, or oil seals, and substantially eliminates if not materially reducing the need for maintenance of the bushing. The contrast is appreciable over the sliding characteristic of the collar bearing, the rubbing characteristic of the face seal, and the rolling characteristic of the anti-friction thrust bearing.

SELF SPACING DISKS—FIG. 6

To simplify molding of the bushing in the cavity of an injection molding die 88 and the molding die core 90, the individual metal disks 92 of a torsielastic bushing 94 to be vulcanized are each dimpled to a precise height on one side so as to present a ring of spaced apart spacer protrusions 96, e.g., three equal size spacer protrusions 96 spaced apart at 120° from each other. As between the two circumferences, the inner 98 and outer 100, it is suitable for the protrusions to be on or adjacent the outer circumference 100. The end disk 92 opposite to the end disk 102 will present the protrusions 96 outwardly facing so as to provide the proper spacing from the confronting wall, not shown, of the injection molding die 88. On the other hand, the end disk 102 will require protrusions 96 in rings thereon on its inner face as well as on its outer face for spacing it midway between the next metal disk 92 and the confronting end wall of the injection molding die 88.

After the disks are stacked at right angles in the die and the die closed, bondable heated elastomer is introduced as by injection molding in the regular, equal parallel intervals between the disks 92 to one another and to the disk 102. Then vulcanization can take place at high heat establishing heat fused interfaces.

In some instances the bonding can be accomplished by interposed cement or other fusable bonding material on each of the rubber to metal interfaces. And, of course, other means are available for precisely spacing the metal disks in the die prior to introduction of the elastomer, particularly the end disks.

In the embodiment of FIG. 6, however, the completed bushing structure if molded to final size will thereafter retain the protrusions therein. Or if subsequently sized by machining off the cylindrical outer circumference, all traces of protrusions can be removed with the removed outer material and no protrusion will be left in the final bushing.

MODIFICATION—FIG. 7

The same as before, in the modified form of the bushing 104 as shown in this figure, the one piece construction is laminated of a multiplicity of alternate layers of generally uniform thin metal disks 106 and of generally uniformly thin elastomer 108 unitarily bonded to each other in aligned overlying relationship, with such elastomer layers having their planes parallel to one another and being of substantially incompressible thickness by proper selection of the shape factor. But if the as-installed end compression preload is high enough, and the rubber traction and sealing characteristics are not quite as critical, then the opposite outer bushing layers selected can be metal disks 110 and 112.

Thus under proper axial compression of the modified bushing 104 by the clamping driving faces 64 and 68, not shown, the driven metal faces 110 and 112 will provide sufficient coefficient of metal to metal friction to cause the bushing 104 to deflect through the proper working angle such as 15° from either side of an angular condition of repose, but at the same time will afford appropriate slippage relative to faces 64, 68 in singular occasions of major adjustment much above such 15° angular deflection to either side.

Instances can arise when the rather stringent design requirements set out so far can be slightly relaxed. Decreases in the rubber shape factor specified for the foregoing designs can in fact be readily accomplished by eliminating therefrom every sixth metal disk, or every fourth, or every third one, as examples. So the relative rubber thickness can be tripled, or doubled, or otherwise relatively increased in the design, and the resulting bulging or column buckling is able to be tolerated in some applications as long as not carried to excess.

Therefore so long as effective end "stiction" persists between the counterbore drive surfaces and compressed driven end surfaces of the bushing where they make their frictional driving contact, the track counterbore bushing will still perform its critical, nonrubbing sealing function the same as before except for a reduced, thrust bearing, load carrying capacity. An offsetting advantage in the added freedom of the bushing to bulge or buckle resides in its being able to accommodate to the rather marked expansion property of the rubber under heat. Rubber displays an appreciably high coefficient of thermal expansion compared to the confining metal of the track link containing the bushing.

In the thrust zone of the foregoing joints, each laminated torsielastic bushing hereof which holds in the oil in contact therewith at the inner circumference forms a leak free barrier through the counterbore space bridged by the bushing as it twists, and obviates the problem of foreign liquid and matter contacting any lubricant, because the dry bushing takes no lubrication. The pivoting or hinging zones are confined to the cylindrical interface in the sleeve-shaped gap immediately between pin and bushing and are subjected to constant lubrication protecting against the ovaling of both pin and bushing from wear at their interface which could otherwise result due to unlubricated internal friction. The resulting drastically reduced internal friction, occurring as the pin and bushing mating surfaces ride on a film of oil because of full time lubrication, reduces both the friction horsepower to drive the track assemblies and the track squeal from the otherwise unlubricated internal friction.

Finally, the present bushing results in such a consolidation of parts permanently into one substantially incompressible piece that no separate metal thrust ring or equivalent, essential with most track seals of the rubbing type, is either necessary or desirable. It is evident the bushing proportions and dimensions will vary from design to design so as to substantially in each fully occupy the counterbored recessed portion of the particular size of track link portions or other recessed portions concerned. Self-evidently, depending upon the joint requirements for its limits of oscillation positively and negatively to the zero angle of repose, the bushing can be readily designed to undergo a 20° limit or 25° or upwards, of relative positive and negative angulation before it desirably begins slipping at either traction end. Variations with the spirit and scope of the inventions described are equally comprehended by the foregoing description.

What is claimed is:

1. Method of rotary seal bearing press assembly of separate parts comprising a track pin to receive links by press fitting and having counterbored track pin links ready to be so pressed, and a pin pushing element therebetween in preassembly having each end of the bushing element in the path of the counterbore at that end and acting as spacer (52) for the assembly, said method characterized by the steps of:

interposing rotary seal-bearing-spacer-bushings of composite material in the preassembly in the paths between the bushing element ends and confronting base of each counterbore, each said spacer-bushing formed in one piece from pluralities of originally discrete laminae of eleastomeric and nonextensible material arranged in alternating layers, each of the laminae of each plurality being substantially incompressible whereby the entire spacer-bushing will be substantially incompressible to compression forces with force up to a substantial magnitude; and pressing together the assembly establishing said link-pin press fit points at final points on the pin permanently determined by the combined axial length of the spacer (52) and its interposed spacer-bushings (70) at its respective ends, maintaining substantial axial bearing preloading to provide a slip free drive between said track pin links and said pin bushing spacer (52).

2. Method of press assembly of separate parts comprising a track pin adapted to receive, as pressed thereupon, counterbored track pin links ready to be so pressed, and a pin bushing element therebetween in preassembly having each end of the bushing element in the path of the counterbore at that end and acting as a spacer (52) for the assembly, said method characterized by the steps of:

interposing laminated torsielastic rotary seal-bearing-spacer bushings in the preassembly in the paths between the pin bushing element and base of each counterbore, each said torsielastic bushing formed in one piece of a multiplicity of alternate layers of generally uniformly thin metal, and of generally uniformly thin elastomer unitarily bonded to each other in aligned overlying relationship, with each such elastomer layer being of substantially imcompressible thickness, whereby said entire torsielastic bushing will be substantially incompressible to compression forces applied substantially normal to said layers while yielding with respect to shear forces in a torsional direction along said layers; and press fitting of the counterbored track pin links (31) onto the track pin (46) with the torsielastic bushings (70) between the opposing surfaces of the counterbore base of the track pin links (31) and of the end of the pin bushing element (52) whereby each torsielastic bushing is compressed to a degree as to provide a slip free drive grip between said track pin links (31) and said pin bushing element (52);

said surfaces gripped by said torsielastic bushing outer layers exhibiting a coefficient of friction of rest with the latter, high enough to ensure slip free twisting of each torsielastic bushing upon predetermined angular relative movement of said track links, and low enough that static frictional resistance will give way to limited slippage of adjustment accommodative of link movement in excesses of said predetermined angular relative movement.

3. The method of claim 2 characterized by: said rotary seal-bearing-spacer-bushing end outer layers being thin elastomer.

4. The method of claim 2 characterized by: said rotary seal-bearing-spacer-bushing end outer layers being thin metal.

5. Protection of the thrust and pivoting zones of an internally lubricated assembly including counterbored track pin links, a pin bushing element therebetween in preassembly having each end of the bushing element in the line of the counterbore at that end and acting during assembly as spacer (52) for the assembly, and a track pin with which the pin bushing element is interfitted and onto which the track links are to be pressed, comprising the steps of:

interposing laminated torsielastic bushings under substantial axial preload in the line between the pin bushing element and base of each counterbore, each said torsielastic bushing formed in one impervious piece of a multiplicity of alternate layers of generally uniformly thin metal, and of generally uniformly thin elastomer unitarily bonded to each other in aligned overlying relationship, with each such elastomer layer being of substantially incompressible thickness, whereby the entire torsielastic bushing will be substantially incompressible to compression force of said axial preload applied substantially normal to said layers while yielding with respect to shear force in a torsional direction along said layers, the outer layers of the respective bushing opposite ends exerting a traction grip with the respective bushing element end and counterbore base surfaces in an uninterrupted pressure ring of torsielastic bushing contact over the full face area over which the load is uniformly distributed; and press fitting of the counterbored track pin links (31) onto the track pin (46) with the torsielastic bushings (70) between said opposing surfaces of the counterbore base of the track pin links and the ends of the pin bushing element (52) whereby the torsielastic bushings are compressed to a degree as to provide a slip free drive grip between said track pin links (31) and said pin bushing element (52), thereby establishing a barrier of contaminant-and-leak-free integrity bridging between and including said surfaces as effectuated by said surfaces gripped by said bushing outer layers exhibiting a coefficient of friction of rest with the latter, high enough to insure slip free twisting of each torsielastic bushing upon predetermined angular relative movement, as a rule, of said track links, and low enough that static frictional resistance will give way to limited slippage of adjustment accommodative in singular instances of excessive link movement, all while blocking off and protecting the thrust and pivoting zones of said assembly.

6. Method of press assembly of separate parts comprising counterbored track pin links ready to be pressed, a pin bushing element therebetween in pre-assembly having each end of the bushing element in the path of the counterbore at that end and acting as spacer (52) for the assembly, and a track pin with which the bushing element is interfitted and onto which the track links are to be pressed, said method characterized by the steps of:

interposing rotary seal-bearing-spacer-bushings in the pre-assembly in the paths between the bushing element and base of each counterbore (66), each said rotary seal-bearing-spacer-bushing formed in one piece of a multiplicity of alternate layers of generally uniformly thin metal, and of generally uniformly thin elastomer unitarily bonded to each other in aligned overlying relationship, with each elastomer layer being of substantially incompressible thickness, whereby said entire rotary seal-bearing-spacer-bushing will be substantially incompressible to compression forces applied substantially normal to said layers while yielding with respect to shear forces in a torsional direction along said layers;

press fitting of the counterbored track pin links (31) onto the track pin (46) with the rotary seal-bearing-spacer-bushings (70) between the opposed surfaces of the counterbore base of the track pin links and of the end of the bushing element (52); and maintaining an axial pre-load on the rotary seal-bearing-spacer-bushings whereby each rotary seal-bearing-spacer-bushing is compressed to a degree as to provide a slip free drive grip between said track pin links (31) and said pin bushing element (52), so as thereafter to insure that the outer layers of the respective opposite ends of each rotary seal-bearing-spacer-bushing exert a traction grip with the respective bushing element and counterbore base surfaces in slip free driving fashion on an uninterrupted pressure ring of torsielastic bushing contact over the full face area over which the loading is uniformly distributed, whereby to torsielastically wind up each rotary seal-bearing-spacer-bushing end to end with rub free shear action as its opposite ends relatively oscillate in opposite torsional directions under the traction drive of the countermoving bushing element and counterbore base surfaces.

7. Protection of the thrust and pivoting zones of an internally lubricated assembly of counterbored track pin links, a bushing element therebetween in preassembly having each end of the bushing element in the line of the counterbore (66) at that end and acting during assembly as spacer (52) for the assembly, and a track pin with which the bushing element is interfitted and onto which the track links are to be pressed, comprising the steps of:

interposing laminated torsielastic rotary seal-bearing-spacer-bushings in the line between the bushing element and base of each counterbore, each said rotary seal-bearing-spacer-bushing formed in one impervious piece of a multiplicity of alternate layers of generally uniformly thin metal, and of generally uniformly thin elastomer unitarily bonded to each other in aligned overlying relationship, with each such elastomer layer being of substantially incompressible thickness, whereby the entire rotary seal-bearing-spacer-bushing will be substantially incompressible to compression force of axial preload applied substantially normal to said layers while yielding with respect to shear forces in a torsional direction along said layers;

press fitting of the counterbored track pin links (31) onto the track pin (46) with the rotary seal-bearing-spacer-bushings (70) between the opposing surfaces of the counterbore base of the track pin links and of the end of the bushing element (52), thereby establishing a barrier of contaminant-and-leak-free integrity bridging between and including the respective opposing surfaces of the bushing element and counterbore bases whereby the latter can be engaged by the respective rotary seal-bearing-spacer-bushing opposite ends in moving theretowards to establish an uninterrupted pressure ring of torsielastic rotary seal-bearing-spacer-bushing contact over the full face area over which load can be uniformly distributed; and thereafter maintaining an axial pre-load whereby the rotary seal-bearing-spacer-bushings are compressed to a degree as to provide a slip free drive grip between said track pin links (31) and said bushing element (52), all for rotary seal-bearing-spacer-bushing traction as effectuated by the rotary seal-bearing-spacer-bushing outer layers exhibiting a coefficient of friction of rest on said face area in slip free driving fashion to the countermoving bushing element end and counterbore base surfaces, whereby to torsielastically wind up the rotary seal-bearing-spacer-bushings end to end with rub free shear action as their opposite ends relatively oscillate.

* * * * *